United States Patent [19]

Hayashi

[11] 4,413,837
[45] Nov. 8, 1983

[54] DEVICE FOR ADJUSTING THE HEIGHT OF VEHICLES

[75] Inventor: Yasuyuki Hayashi, Fukuroi, Japan

[73] Assignee: Showa Manufacturing Co., Ltd., Tokyo, Japan

[21] Appl. No.: 240,455

[22] Filed: Mar. 4, 1981

[30] Foreign Application Priority Data

Jul. 24, 1980 [JP] Japan .............................. 55-100481

[51] Int. Cl.$^3$ ............................................ B60G 11/26
[52] U.S. Cl. .................................... 280/707; 280/688
[58] Field of Search ............................... 280/688, 707

[56] References Cited

U.S. PATENT DOCUMENTS 3,941,402 3/1976 Yankowski et al. ................ 280/688
4,159,126 6/1979 Raleigh .............................. 280/688

Primary Examiner—Richard A. Bertsch
Attorney, Agent, or Firm—A. W. Breiner

[57] ABSTRACT

A system for automatically adjusting the height of a vehicle wherein a polarity-determination pattern detector and an allowable-displacement pattern detector are disposed in confronting relation to and movable relative to a pattern plate in parallel directions in response to variations in the height of a vehicle. The pattern plate has a polarity-determination pattern having one end positioned in confronting relation to the polarity-determination pattern detector and extending in a direction of movement of the pattern plate, and an allowable-displacement pattern having a center thereof positioned in confronting relation to the allowable-displacement pattern detector and extending in the direction of movement of the pattern plate. The pattern plate may be provided with a plurality of such polarity-determination and allowable-displacement patterns. An electrical circuit generates a signal indicative of an increase or decrease in the vehicle height depending on whether or not there is an output signal from the polarity-determination pattern detector when there is no output signal from the allowable-displacement pattern detector for a predetermined interval of time. With such an arrangement, the vehicle height can automatically be adjusted even while the vehicle is running.

5 Claims, 7 Drawing Figures

DEVICE FOR ADJUSTING THE HEIGHT OF VEHICLES

BACKGROUND OF THE INVENTION

1. Field of the Invention

The present invention relates to a device for adjusting the height of vehicles, more particularly the invention relates to a device for automatically adjusting the height of vehicles, such as two-wheeled or four-wheeled vehicles, including when the vehicle is in operation.

2. Description of the Prior Art

The height of two-wheeled vehicles has heretofore been varied by adjusting spring seats for vehicle body suspension springs. The adjusting procedure, however, has been complicated, time-consuming, and has required an advanced degree of skill on the part of the operator.

Adjustment of the height of four-wheeled vehicles is easier than the adjustment of the height of two-wheeled vehicles, but in the systems presently known requires adjustment of pneumatic pressure for an air suspension systems, which cannot be effected while the vehicle is running or in operation.

SUMMARY OF THE INVENTION

According to the present invention, a system for automatically adjusting the height of a vehicle is provided comprising a pattern plate which has patterns located in confronting relation to means for detecting one of the patterns for polarity determination and means for detecting the other patterns for allowable displacement, both means and the pattern plate being movable relative to each other in parallel directions. According to the system, when there is no output from the allowable-displacement pattern detecting means on movement relative to the other pattern for a predetermined interval of time, the height of a vehicle is increased or decreased depending on whether there is an output signal from the polarity-determination pattern detecting means on movement relative to the one of the patterns.

Accordingly, it is a primary object of the present invention to provide a device for automatically adjusting the height of a two-wheeled or four-wheeled vehicle even while the vehicle is running.

Further objects, advantages, and features of the present invention will become more fully apparent from a detailed consideration of the arrangement and construction of the constituent parts as set forth in the following specification taken together with the accompanying drawings.

DETAILED DESCRIPTION OF THE PREFERRED EMBODIMENT

Figure 1:
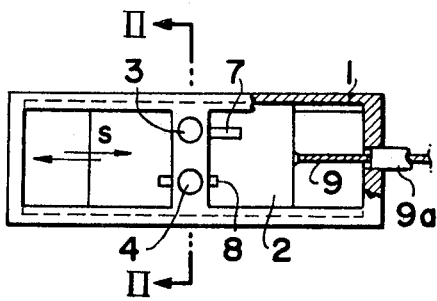
FIG. 1 is a front elevational view of a vehicle-height variation detector in a device for adjusting the height of vehicles according to the present invention.
Figure 2:
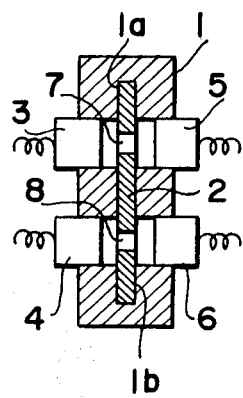
FIG. 2 is a cross-sectional view taken along line II—II of FIG. 1.

In FIGS. 1 and 2, a rectangular frame 1 includes a pair of side members having opposed surfaces guide grooves 1a, 1b, respectively, in which a pattern plate 2 is slidably fitted. The frame 1 also includes a central bridge having mounted thereon a polarity-determination pattern detector 3, an allowable-displacement pattern detector 4, and suitable light sources 5, 6 disposed in opposed relation to the detectors 3, 5, respectively, the detectors comprising photoelectric elements. The pattern plate 2 includes a polarity-determination pattern 7 having one end normally positioned in confronting relation to the detector 3 and extending in a direction in which the pattern plate 2 is slidable, and an allowable-displacement pattern 8 having a center thereof normally positioned in confronting relation to the detector 4 and extending in the direction of sliding movement of the pattern plate 2. The patterns 7, 8 comprise through slots, respectively. When they are brought into confronting relation to the detectors 3, 4, the slots allow light from the light sources 5, 6 to enter the detectors 3, 4, which then produce output signals. A flexible wire 9 is connected at one end thereof to the pattern plate 2 and has a wire sheath 9a fixed to the frame 1, the other end of the wire 9 being connected to a swing arm or front-wheel bearing (not shown) of a two-wheeled vehicle. Alternatively, the frame 1 and pattern plate 2 are connected directly to a body and axle (not shown) of a vehicle. Accordingly, variations in the height or level of a vehicle cause the pattern plate 2 to move in directions indicated by the arrows s, so that the detectors 3, 4 are switched on and off for generation of their output signals.

Figure 3:
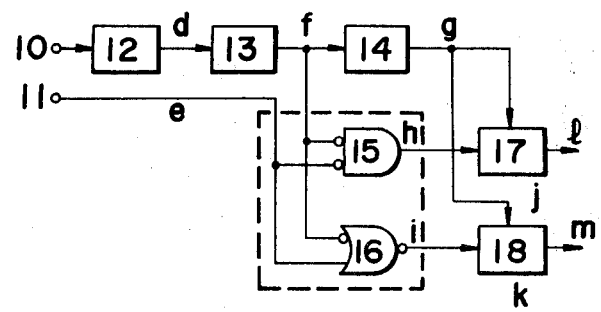
FIG. 3 is a block diagram of an electrical control circuit for the device of the invention.
Figure 4:
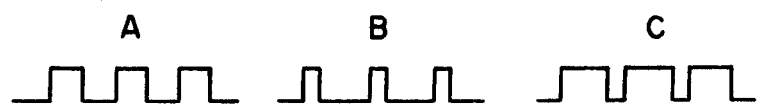
FIGS. 4A, 4B, and 4C show a variety of waveforms of a signal supplied from the detector shown in FIG. 1.
Figure 5:
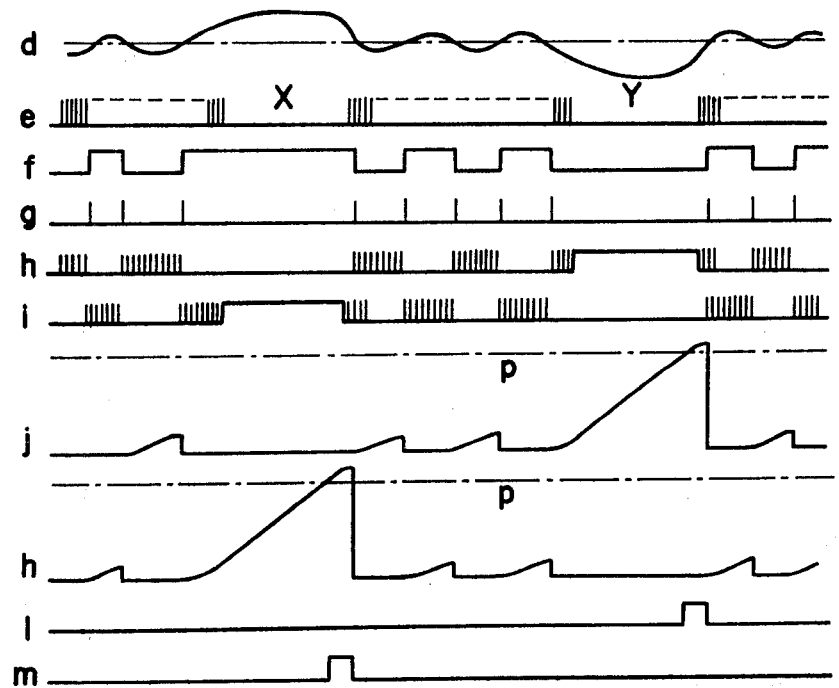
FIG. 5 is illustrative of various waveforms of signals at points or stages in the circuit shown in FIG. 3.

The outputs from the polarity-determination pattern detector 3 and the allowable-displacement pattern detector 4 are applied to terminals 10, 11 (FIG. 3). When the pattern plate 2 is caused to reciprocate equal distances to the right and left of a reference position as shown in FIG. 1, the detector 3 generates a signal of a square waveform having a duty factor of unity as shown in FIG. 4A. As the range of reciprocating movement of the pattern plate 2 is shifted more to the left, the duty factor of the signal generated from the detector 3 becomes smaller as shown in FIG. 4B. Conversely, the duty factor becomes greater when the range of reciprocation of the pattern plate 2 is shifted more to the right. The signal is applied from the terminal 10 to a smoothing circuit 12, which produces a signal d, as illustrated in FIG. 5, having an amplitude that varies depending on the duty factor of the signal applied to the smoothing circuit 12, the signal from the smoothing circuit 12 being supplied to a waveform shaper 13. On the other hand, the allowable-displacement pattern detector 4 generates a signal having a waveform as described above when the pattern plate 2 reciprocates beyond the ends of the pattern 8 substantially at the reference position. When the pattern plate 2 reciprocates at a position which is greatly shifted to the right or to the left from the reference position, the pattern 8 becomes displaced out of registration with the detector 4, which then produces a signal having a waveform shown at e as illustrated in FIG. 5 corresponding to the signal d. The signal from the detector 4 is applied to a terminal 11.

The dot-and-dash line shown at d in FIG. 5 is indicative of the condition in which the duty factor of the signal at the terminal 10 is unity. With such a duty factor serving as a threshold level, the waveform shaper 13 forms the signal d into a signal or square waveform shown at f in FIG. 5, which is applied to a differentiator 14. The differentiator 14 then generates a two-way differential signal illustrated at g in FIG. 5.

The inverted signal of the signal e and the inverted signal of the signal f are supplied to an AND gate 15, and the signal e and the inverted signal of the signal f are supplied to a NOR gate 16, the gates 15, 16 producing as output signals shown at h and i, respectively, in FIG. 5. The signals h, i from the gates 15, 16 are integrated by integrators 17, 18, respectively, which produce signals l, m, respectively, for increasing and reducing the height or level of a vehicle, when respective results of integration j, k (shown in FIG. 5) in the integrators 17, 18 exceed a predetermined level shown at P in FIG. 5. The integrators 17, 18 will be reset by the signal g applied thereto. When the signal l or m is produced, pressurized gas is introduced into or discharged from hydraulic shock absorbers for vehicle body suspension so that the height of the vehicle is automatically adjusted. The signal g is applied to the integrators 17, 18 for resetting them when pattern plate 2 is returned to the reference position upon automatic height adjustment.

With the arrangement described herein, the height-adjustment command signals l and m are generated when the pattern plate 2 is moved back and forth with the pattern 8 being shifted out of registration with the detector 4 as indicated by X and Y in the signal e, and when the output of the smoothing circuit 12 continues to be at a level that is above or below the threshold level for a given interval of time so that no differential signal g is produced. The output signal from the waveform shaper 13 becomes either on or off as shown at f in FIG. 5 depending on whether the pattern 7 is in or out of registration with the detector 3 while the pattern plate 2 is reciprocating. This makes it possible to determine whether to increase or reduce the height of the vehicle.

Since the foregoing detecting operation can be performed when the pattern plate 2 is moved back and forth, the vehicle height can be automatically adjusted while the vehicle, which may be two-wheeled or four-wheeled, for example, is running. When it is necessary to change the height of a two-wheeled vehicle due to a change in the weight of the carried load such as when one or two persons ride on the vehicle, either the pattern plate 2 may be provided with a plurality of polarity-determination patterns 7 and allowable-displacement patterns 8, or the detectors may be changed in position for achieving a desired vehicle height. To provide for an instance in which the driver leaves the vehicle with the engine running, the electrical circuit may be arranged so that it will be switched off in response to operation of vehicle supporting legs. The patterns 7, 8 may be formed of light-reflective material, or as an alternative the detectors 3, 4 may comprise magnetic-flux detecting elements and the patterns 7, 8 may be formed of magnetic material.

While the present invention has been described with reference to a particular embodiment thereof, it will be understood that numerous modifications may be made by those skilled in the art without actually departing from the spirit and scope of the invention as defined in the appended claims.

It is claimed:

1. A device for adjusting the height of a vehicle, comprising:
    a slidable pattern plate;
    at least one each of a polarity-determination and allowable-displacement pattern on said slidable pattern plate, said pattern and pattern plate including through slots;
    at least one each of a polarity-determination and allowable-displacement pattern on said slidable pattern plate;
    means movable relative to said pattern plate in parallel relation in response to a change in the vehicle height for detecting said polarity-determination pattern in confronting relation;
    means movable relative to said pattern plate in parallel relation in response to a change in the vehicle height for detecting said allowable-displacement pattern in confronting relation, said polarity-determination pattern having one end thereof normally positioned in confronting relation to said polarity-determination pattern detecting means and extending in a direction of movement of the pattern, and said allowable-displacement pattern having a center thereof normally positioned in confronting relation to said allowable-displacement pattern detecting means and extending in a direction of movement of the pattern; and
    an electrical circuit for producing a signal indicative of an increase or reduction in the vehicle height depending on whether or not said polarity-determination pattern detecting means produces an output signal when said allowable-displacement pattern detecting means produces no output signal.

2. A device according to claim 1, said detecting means comprising photoelectric elements, respectively.

3. A device according to claim 1, said detecting means comprising magnetic-flux detecting elements, respectively, and said patterns being formed of magnetic material.

4. A device according to claim 1, said electrical circuit being de-energizable in response to operation of vehicle supporting legs.

5. A device according to claim 1, said electrical circuit comprising a differentiator receptive of a signal serving as a threshold level obtained by shaping an output signal from said polarity-determination pattern detecting means, an AND gate to which are applied the inverted signal of said first-mentioned signal and the inverted signal of an output signal from said allowable-displacement pattern detecting means, a NOR gate to which are applied the inverted signal of said first-mentioned signal and said output signal from said allowable-displacement pattern detecting means, a first integrator for integrating signals from said differentiator and said AND gate, and a second integrator for integrating signals from said differentiator and said NOR gate, the arrangement being such that gas is introduced into or discharged from a hydraulic shock absorber for vehicle suspension when results of integration exceed a predetermined level.

* * * * *